US006839684B1

United States Patent
Rissanen et al.

(10) Patent No.: US 6,839,684 B1
(45) Date of Patent: Jan. 4, 2005

(54) HOST-SPONSORED DATA TRANSMISSION BILLING SYSTEM AND METHOD

(75) Inventors: Jussi Rissanen, Helsinki (FI); Ari Aarnio, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/455,250

(22) Filed: Dec. 6, 1999

(51) Int. Cl.[7] .............................................. G06F 19/00
(52) U.S. Cl. ............... 705/34; 379/114.03; 379/114.28; 455/406
(58) Field of Search .......................... 455/556.1, 556.2, 455/406–408; 705/34; 379/114.03, 114.28; 725/1–8; 709/219–229

(56) References Cited

U.S. PATENT DOCUMENTS

| | | | | |
|---|---|---|---|---|
| 5,745,884 A | * | 4/1998 | Carnegie et al. | ............... 705/34 |
| 6,389,008 B1 | * | 5/2002 | Lupien et al. | ............... 370/352 |
| 6,405,055 B1 | * | 6/2002 | Silverbrook et al. | ........ 455/556 |

FOREIGN PATENT DOCUMENTS

| | | |
|---|---|---|
| WO | WO 97/26739 | 7/1997 |
| WO | WO 98/09456 | 5/1998 |
| WO | 0-891-062 A2 | 1/1999 |

OTHER PUBLICATIONS

Business Wire, Oct. 20, 1999, "Southern LINC Brings Wireless Data and Internet Services to Business Market".*

* cited by examiner

Primary Examiner—Richard Chilcot
(74) Attorney, Agent, or Firm—Antonelli, Terry, Stout & Kraus, LLP

(57) ABSTRACT

A host-sponsored data transmission billing system and method is provided to permit reduced costs to a mobile user for internet access through an internet gateway. An operator billing system is provided (either in the internet gateway itself or coupled to the internet gateway) to generate billing data for payment by the mobile user for connection requests by the mobile user through the internet gateway to private sites on the internet. However, to reduce the costs to the mobile user to encourage access to host-sponsored commercial sites, the operator billing system bills data for payment by host-sponsors for connection requests by the mobile user to the host-sponsored sites. A General Packet Radio System (GPRS) can be utilized in this arrangement as the internet gateway.

20 Claims, 3 Drawing Sheets

HOST-SPONSORED DATA TRANSMISSION BILLING SYSTEM AND METHOD

FIELD OF THE INVENTION

The present invention relates to the field of telecommunications/mobile phones, and more specifically to an improved system and method for mobile internet access and billing.

BACKGROUND OF THE INVENTION

Recently, substantial development has occurred in systems and methods for mobile internet access. In particular, increased data transmission rates have been brought about by the Global System for Mobile Communications (GSM) evolution with systems such as General Packet Radio System (GPRS) and Enhanced Data Rates for Global Evolution (EDGE). The GPRS and EDGE systems allow for higher bit rates in wireless access enabling mobile internet. In short, the technology has now been developed to make mobile internet access readily available.

Unfortunately, an emerging problem has developed with regard to the question of who will pay for the wireless data traffic in a telecom operator's cellular network for such mobile internet access. In general, customers are accustomed to low price or free internet access. On the other hand, current systems which permit mobile internet access charge the customer for wireless access to the same internet sites which they could access either for free or at a much lower cost if they were not using mobile access. Therefore, it has become a serious concern that users will view mobile internet access as too expensive for casual web browsing. This could seriously stunt the development of mobile internet access. On the other hand, E-commerce via mobile internet access could be significantly enhanced if free or low cost access could be provided to catalogs and marketing materials.

SUMMARY OF THE INVENTION

It is an object of the present invention to provide an improved billing system and method for mobile internet access.

To achieve this and other objects, the present invention provides a host-sponsored data transmission billing system and method for mobile users. An internet gateway is provided to establish wireless connection between a mobile user and the internet. The internet gateway generates billing data for payment by the mobile user for connection requests by the mobile user through the internet gateway to private sites on the internet. On the other hand, the internet gateway also generates billing data for payment by host-sponsors for connection requests by the mobile user to host-sponsored sites on the internet. In other words, some or all of the data traffic billing that is incurred in accessing a host-sponsored site is incurred by the host that operates the site in question.

DETAILED DESCRIPTION

Figure 1:
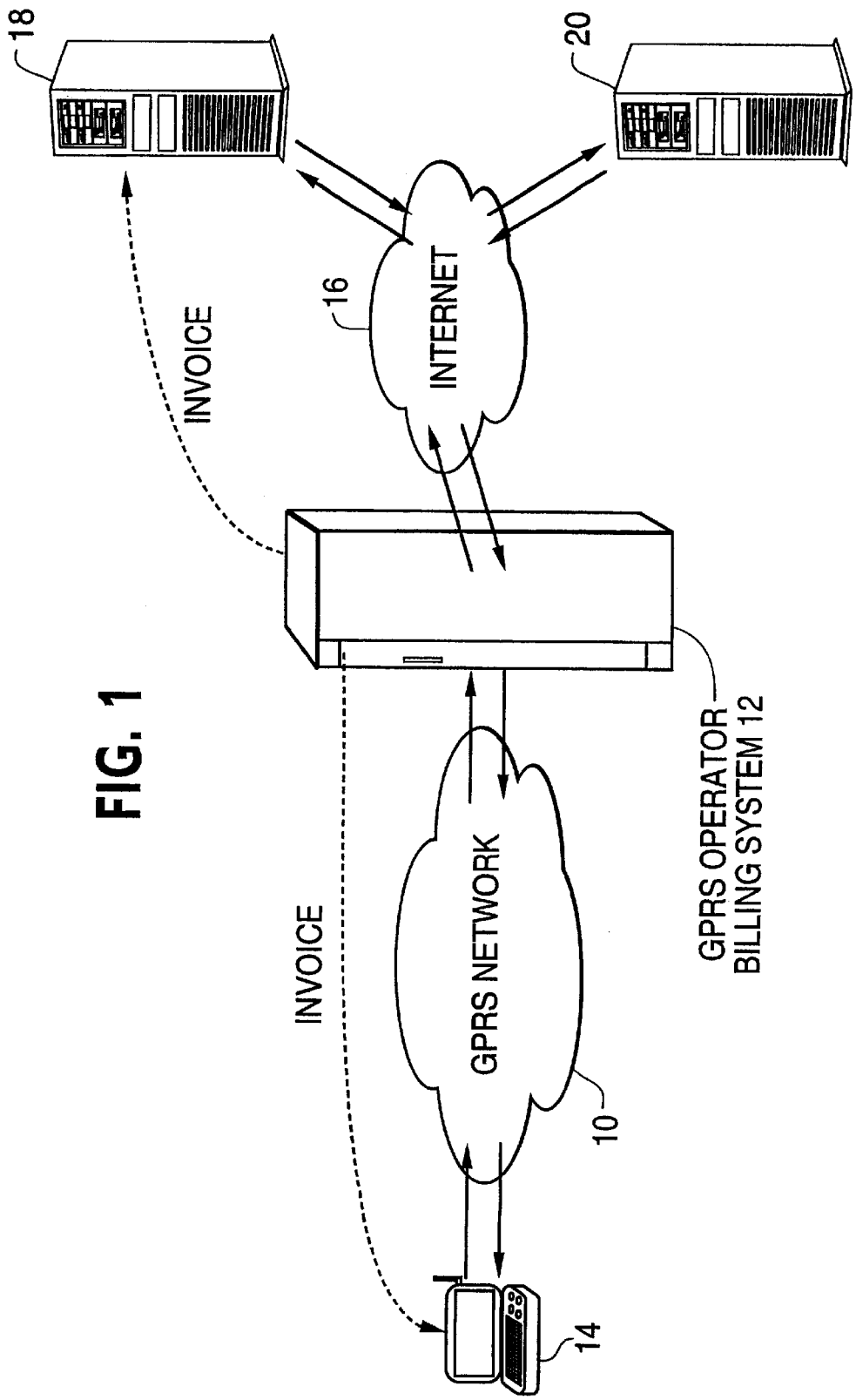
FIG. 1 is a block diagram showing an overall view of a host-sponsored data transmission billing system in accordance with the present invention.

FIG. 1 provides an overall view of a host-sponsored data transmission billing system in accordance with the present invention. In particular, FIG. 1 shows an arrangement using a GPRS network 10 and a GPRS operator billing system 12 to permit connection of a mobile user 14 to the internet 16. As shown in FIG. 1, the mobile user can be connected via the GPRS network 10, the GPRS operator billing system 12 and the internet 16 to either a host-sponsored commercial website 18 or a private website 20. The commercial website 18 offers free data transmission (or at least reduced cost transmission) to customers when it is accessed by a mobile user. In accordance with the present invention, the GPRS operator billing system 12 will directly bill the commercial website 18 (or the company sponsoring the commercial website 18) for the access and data transmission of the mobile user 14.

When the mobile user 14 accesses the private site 20, on the other hand, the GPRS operator billing system 12 will bill the mobile user 14 directly. As such, the GPRS operator billing system 12 will generate two types of invoices, one directly to the mobile user 14 and the other to the commercial websites 18 or companies sponsoring the commercial websites 18.

It is noted at this point that packet switched radio connections such as GPRS permit for billing per use or billing per amount of data transmitted via the radio network while the connection may remain open continuously. In accordance with the arrangement shown in FIG. 1, the GPRS billing system 12 is designed in such a manner that the billing incurred will be earmarked according to whether it belongs to the host-sponsor or to the consumer. Invoices are generated accordingly. It is envisioned that this will substantially increase the mobile access to commercial sites since customers will enjoy the same low cost or free access when they use mobile internet access that they obtain using conventional telephone internet access.

Figure 2:
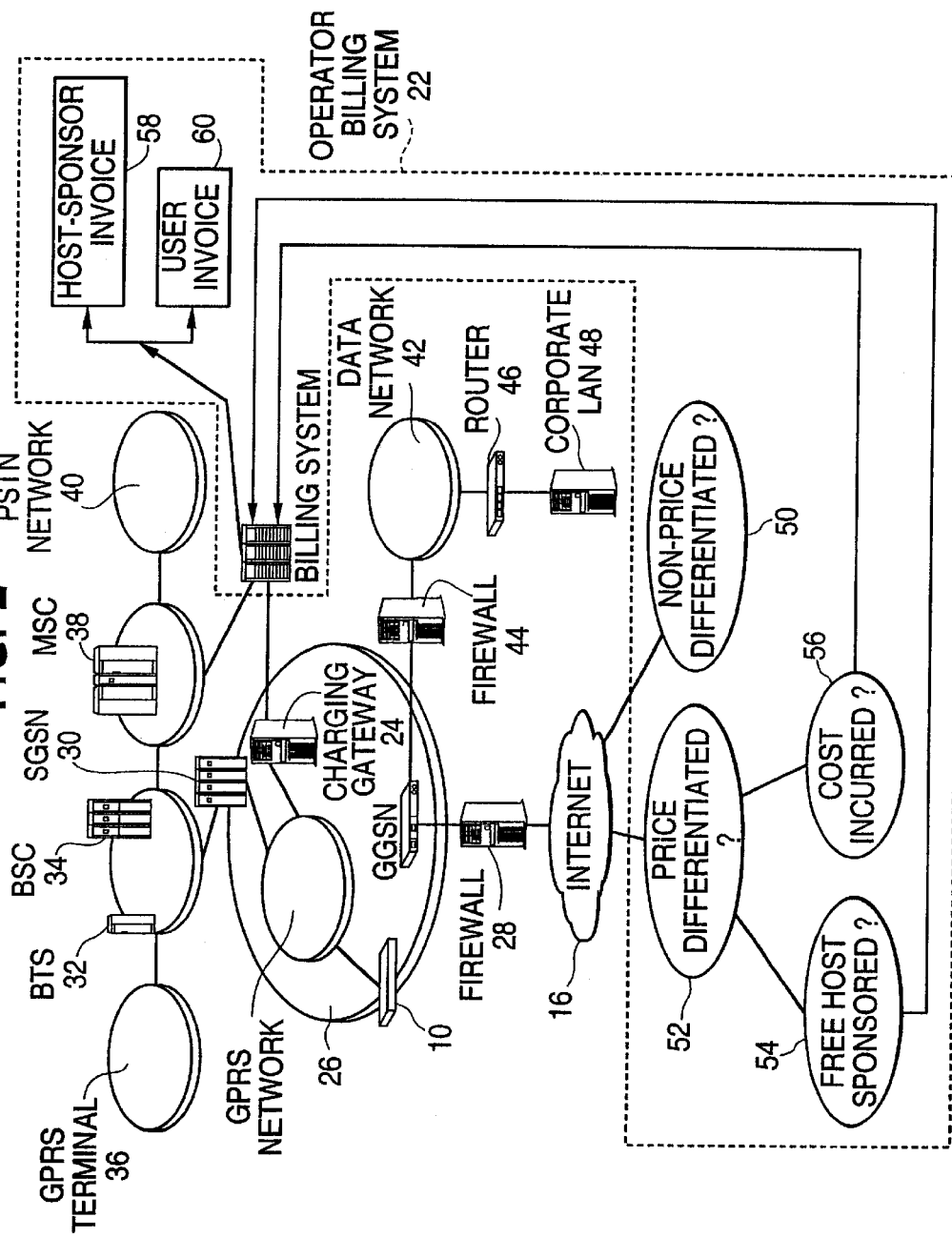
FIG. 2 is a block diagram showing an embodiment of the present invention using a GPRS network and a charging gateway connecting to an external billing system for a host-sponsored data transmission billing system in accordance with the present invention.

FIG. 2 provides a more detailed illustration of a host-sponsored data transmission billing system using a GPRS network 10 in conjunction with an operator billing system 22 which is external to the GPRS network 10. In order to provide a single access point from the GPRS network 10 to the external operator billing system 22, a charging gateway 24 is provided. For example, this can be the currently available stand alone Nokia charging gateway, specifically modified for operation with external billing systems to generate separate invoices to mobile users and host-sponsors in accordance with the present invention.

In order to interface between the GPRS network 10 and the internet, a Gateway GPRS Support Node (GGSN) 26 is provided. A security firewall 28 can also be locate between the GGSN 26 and the internet. On the other hand, a Service GPRS Support Node (SGSN) 30 can be provided between the GPRS network 10 and a Base Transceiver Station (BTS) 32, and a Base Station Controller (BSC) 34. A GPRS terminal 36 is coupled to the BTS 32. The BCS 34 is coupled to a Mobile Services Switching Center (MSC) 38. The MSC 38 is, in turn, coupled to a Public Switching Telephone Network (PSTN) network 40. It is noted that these elements form part of the overall network structure already manufactured by Nokia as part of the GPRS core solution.

Other elements of the Nokia GPRS network include a data network 42 which can be coupled to the GGSN 26 by way of a firewall 44. This arrangement is typically used in conjunction with a router 46 for coupling to a corporate LAN 48.

In accordance with the present invention, the standard Nokia GPRS structure noted above is modified in accordance with the present invention to generate separate billing for user access to private sites and host-sponsored sites. FIG. 2 shows operations carried out by the billing system 22 in order to generate separate invoices for the mobile user and the host-sponsor. As a first step 50, it is determined whether the access is non-price differentiated. If so, the present invention is not utilized. On the other hand, if step 52 determines that the access is price differentiated, the next step is to determine whether it is a free, host-sponsored access (step 54) or a cost incurring access for the mobile user (step 56). If it is determined in step 54 that the access is a free host-sponsored access, an invoice is generated to the host-sponsor (step 58). On the other hand, if it is determined in step 56 that the access is a cost incurring one for the mobile user, an invoice is generated to the mobile user (step 60).

Figure 3:
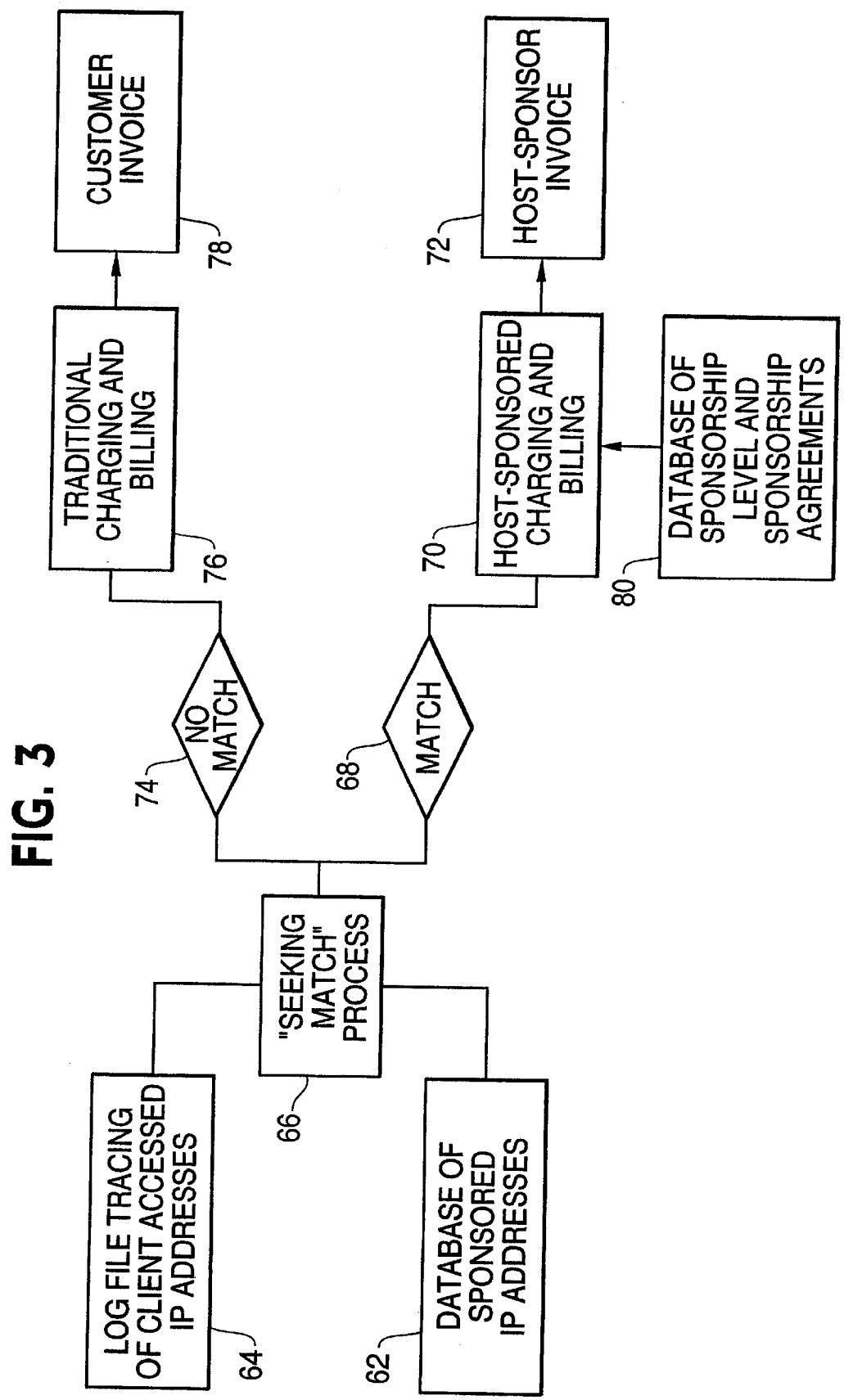
FIG. 3 is a flowchart of a log file tracing process to implement a host-sponsored data transmission billing system in accordance with the present invention.

FIG. 3 shows a log file tracing process which can be used to carry out the steps 54, 56, 58 and 60. In this process, a database 62 is provided of IP addresses for host-sponsored sites. In step 64, log file tracing of client (mobile user) accessed IP addresses is carried out. In the comparison step 66, a "seeking match" process is carried out to determine whether the IP addresses accessed by the client during the log file tracing operation are the same as any IP addresses stored in the database 62 of host-sponsored sites.

If a match is determined in step 68, this means that the client accessed IP address in question is to a host-sponsored site. In this case, charges are incurred to the sponsoring host (step 70). Accordingly, in step 72, an invoice is generated to the host-sponsor.

On the other hand, if no match is found between the client accessed IP address and the database 62 (as per step 74), the charging and billing is carried out in a traditional manner in step 76. In this case, an invoice is generated to the customer (step 78) in the conventional manner.

The above description assumes that the host-sponsor has agreed to cover the entire costs for mobile users to access their host-sponsored sites. However, in accordance with the present invention, the host-sponsor could agree to cover only part of the charge. In addition, different levels of sponsorship and sponsorship agreements could be provided. Thus, FIG. 3 also shows a database of the level of sponsorship and sponsorship agreements (database 80). This information is taken into account in step 70 to adjust the invoice to the host-sponsor accordingly in step 72. Of course, in this case, the remaining charges would be charged to the mobile user through steps 76 and 78.

As one example of an alternative to completely free access, the host-sponsor might agree to provide a certain amount of access (in other words, providing a limited number of bits). For example, one megabit of free access could be provided. In this case, the billing system 22 would contain a record of the number of used bits and the available bits remaining to be used by the mobile user.

Another possibility for less than complete sponsorship would be free access to predetermined pages of the website. Alternatively, when the mobile user buys something, a billing system 22 can provide a certain amount of free time or bits to be added to the presently available number of bits for the user. The amount of free time or bits could be made dependent upon the items or services purchased. For example, purchasing from a particular website page could generate bonus points.

In the event that less than complete sponsorship is provided, the step 54 in FIG. 2 will provide the user terminal ID number, the number of used bits to date (so that a determination can be made of available bits), and any purchase information which might reflect in an increase of the total number of available bits.

By virtue of the arrangements discussed above for implementing the present invention, access to commercial host-sponsored websites will be much more attractive to mobile users since they will be free to browse and download from such websites either for free or at substantially reduced costs. As such, the present invention removes, or at least reduces, the cost impediments presently faced in mobile internet access.

While the present invention has been described in detail and pictorially in the accompanying drawings, it is not limited to such details since many changes and modifications recognizable to those of ordinary skill in the art may be made to the invention without departing from the spirit and the scope thereof.

We claim:

1. A host-sponsored data transmission billing system for billing for Internet connections between a mobile user and an Internet site, said system comprising:
   a mobile terminal for connecting the mobile user to a cellular telecommunications network;
   an Internet gateway for connecting the mobile user to the Internet site via the cellular telecommunications network; and
   a billing system including means to determine whether the Internet site is a private site or a host sponsored site, means responsive to determination that the site is a private site to generate billing data for payment by the mobile user for the connection, and means responsive to determination that the site is a host sponsored site to generate billing data for payment by the host sponsor of the site for the connection wherein the means to determine whether the Internet site is a private site or a host sponsored site comprises a database of Internet Protocol (IP) addresses for host-sponsors, a log file tracer to provide an output indicative of the IP addresses accessed by the mobile user, and a comparator for comparing the output of the log file tracer with the IP addresses stored in the database to determine whether the IP addresses accessed by the mobile user are to host-sponsored sites.

2. A host-sponsored data transmission billing system according to claim 1, wherein the Internet gateway comprises a General Packet Radio System (GPRS).

3. A host-sponsored data transmission billing system according to claim 2, wherein the GPRS includes an operator billing system.

4. A host-sponsored data transmission billing system according to claim 2, wherein the GPRS includes a charging gateway for connecting to an operator billing system outside of the GPRS.

5. A host-sponsored data transmission billing system according to claim 2, further comprising a Gateway GPRS Support Node (GGSN) which connects the GPRS to the Internet.

6. A host-sponsored data transmission billing system according to claim 1, wherein the host-sponsored sites are commercial sites.

7. A host-sponsored data transmission billing system according to claim 1, wherein the means to generate billing data for payment by the mobile user comprises means to generate a first invoice; and the means to generate billing data for payment by the host sponsor comprises means to generate a second invoice.

8. A host-sponsored data transmission billing system according to claim 1, wherein:

the means to generate billing data for payment by a mobile user comprises a first invoice generator to generate an invoice to the mobile user; and the means to generate billing data for payment by the host sponsor comprises a second invoice generator to generate invoices to the host sponsor for the site.

9. A host-sponsored data transmission billing system according to claim 3, wherein the operator billing system comprises:

a database of Internet Protocol (IP) addresses for host-sponsors;

a log file tracer to provide an output indicative of the IP addresses accessed by the mobile user; and a comparator for comparing the output of the log file tracer with the IP addresses stored in the database to determine whether the IP addresses accessed by the mobile user are to host-sponsored sites.

10. A host-sponsored data transmission billing system according to claim 9, wherein:

the means to generate billing data for payment by the mobile user comprises a first invoice generator to generate an invoice to the mobile user; and the means to generate billing data for payment by the host sponsor comprises a second invoice generator to generate invoices to the host sponsor of the site.

11. A host-sponsored data transmission billing system according to claim 4, wherein the operator billing system comprises:

a database of Internet Protocol (IP) addresses for host-sponsors;

a log file tracer to provide an output indicative of the IP addresses accessed by the mobile user; and a comparator for comparing the output of the log file tracer with the IP addresses stored in the database to determine whether the IP addresses accessed by the mobile user are to host-sponsored sites.

12. A host-sponsored data transmission billing system according to claim 11, wherein:

the means to generate billing data for payment by the mobile user comprises a first invoice generator to generate an invoice to the mobile user; and the means to generate billing data for payment by the host sponsor comprises a second invoice generator to generate in voices to the host sponsor of the site.

13. A host-sponsored data transmission system in accordance with claim 1 wherein:

the Internet gateway comprises a General Packet Radio System (GPRS);

the GPRS includes an operator billing system;

the GPRS includes a charging gateway for connecting to an operator billing system outside of the GPRS;

the host sponsored sites are commercial sites;

the means to generate billing data for payment by the mobile user comprises means to generate a first invoice; and the means to generate billing data for payment by the host sponsor comprises means to generate a second invoice; and further comprising a Gateway GPRS Support Node (GGSN) which connects the GPRS to the Internet.

14. A host-sponsored data transmission billing system for billing for Internet connections between a mobile user and an Internet site, said system comprising:

a mobile terminal for connecting the mobile user to a cellular telecommunications network;

means for connecting the mobile user to an Internet site via the cellular telecommunications network; and, a billing system including means for determining whether the Internet site is a private site or a host sponsored site, means responsive to determination that the site is a private site for generating billing data for payment by the mobile user, and means responsive to determination that the site is a host sponsored site for generating billing data for payment by the host sponsor of the site wherein the means to determine whether the site is a private site or a host sponsored site comprises means for storing IP addresses of host-sponsored Internet sites, means for tracing log files to determine IP addresses accessed by the mobile user, and means for comparing the IP addresses accessed by the mobile user with the stored IP addresses for the host-sponsored sites.

15. A host-sponsored data transmission billing system according to claim 14, wherein the means for generating billing data for payment by the mobile user comprises means for generating a first invoice; and the means for generating billing data for payment by the host sponsor comprises means for generating a second invoice.

16. A host-sponsored data transmission billing system according to claim 14, wherein:

the means to generate billing data for payment by the mobile user comprises means for generating a first invoice to the mobile user; and the means to generate billing data for payment by the host sponsor comprises means for generating an invoice to the host sponsor of the site.

17. A method of billing for Internet access by a mobile user using a mobile terminal to sites on the Internet, said method comprising:

establishing a wireless connection between the mobile user using the mobile terminal to a site on the Internet via a cellular telecommunications network;

determining whether the connected site is a private site or a host sponsored site;

when the site is a private site, generating billing data for the connection for payment by the mobile user; and when the site is a host sponsored site, generating billing data for the connection for payment by the host sponsor, wherein:

determining whether the connected site is a private site or a host sponsored site comprises storing IP addresses of host-sponsored Internet sites, tracing log files to determine the IP address of the connected site; and comparing the determined IP address with the stored IP addresses.

18. A method according to claim 17, wherein the wireless connection is established by a GPRS.

19. A method according to claim 17, wherein:

generating billing data for payment by the mobile user comprises generating an invoice to the mobile user; and generating billing data for payment by the host sponsor comprises generating an invoice to the host sponsor.

20. A host-sponsored data transmission billing system for billing for Internet connections between a mobile user and an Internet site, said system comprising:

a mobile terminal for connecting the mobile user to a cellular telecommunications network;

an Internet gateway for connecting the mobile user to the Internet site via the cellular telecommunications network; and a billing system coupled with said Internet gateway including a database identifying Internet Protocol (IP) addresses for host-sponsored Internet site, means for tracing IP addresses of Internet sites accessed by the mobile user to provide a log file output indicative of the accessed IP addresses, means for comparing the log file output with the IP addresses stored in the database to determine whether the IP addresses accessed by the mobile user matches with IP addresses of host-sponsored Internet sites, means responsive to determination by the means for comparing that the accessed Internet site is a private site for generating billing data for payment by the mobile user for the connection, and means responsive to determination by the means for comparing that the accessed Internet site is a host sponsored Internet site for generating billing data for payment by the host sponsor of said Internet site for the connection.

* * * * *